(12) United States Patent
Hyun (10) Patent No.: US 11,508,198 B2
(45) Date of Patent: Nov. 22, 2022

(54) SMART CARD KEY (71) Applicant: CONTINENTAL AUTOMOTIVE GMBH, Hannover (DE)

(72) Inventor: YoungJin Hyun, Singapore (SG)

(73) Assignee: Honda Motor Co., Ltd., Tokyo (JP)

( * ) Notice: Subject to any disclaimer, the term of this patent is extended or adjusted under 35 U.S.C. 154(b) by 288 days.

(21) Appl. No.: 16/764,416

(22) PCT Filed: Nov. 26, 2018

(86) PCT No.: PCT/IB2018/059281
§ 371 (c)(1),
(2) Date: May 15, 2020

(87) PCT Pub. No.: WO2019/102421
PCT Pub. Date: May 31, 2019

(65) Prior Publication Data
US 2020/0357208 A1 Nov. 12, 2020

(30) Foreign Application Priority Data

Nov. 24, 2017 (KR) .......................... 10-2017-0158775

(51) Int. Cl.
G07C 9/00 (2020.01)
H01M 50/216 (2021.01)

(52) U.S. Cl.
CPC ..... *G07C 9/00944* (2013.01); *G07C 9/00896* (2013.01); *H01M 50/216* (2021.01);
(Continued)

(58) Field of Classification Search
CPC ............ G07C 9/00944; G07C 9/00896; G07C 2009/00587; G07C 2009/00976;
(Continued)

(56) References Cited

U.S. PATENT DOCUMENTS 5,552,240 A * 9/1996 Derstine ............. H01M 50/216
429/96
6,553,802 B1 4/2003 Jacob
(Continued)

FOREIGN PATENT DOCUMENTS

CN 103198537 A 7/2013
CN 203774394 U 8/2014
(Continued)

OTHER PUBLICATIONS

International Search Report with Written Opinion of the International Searching Authority, dated Apr. 8, 2019, with respect to International Application No. PCT/IB2018/059281.
(Continued)

*Primary Examiner* — Edwin C Holloway, III
(74) *Attorney, Agent, or Firm* — Carrier Blackman & Associates, P.C.

(57) ABSTRACT

Disclosed is an invention related to a card type smart key. The disclosed card type smart key includes a key main body part having a circuit substrate installed thereinside, a battery cover part having a battery mounted thereon and inserted into an insertion part formed in the key main body part, and a contact part installed in the key main body part so as to be in contact with the battery and having elastic restoration force in the battery side direction.

12 Claims, 8 Drawing Sheets

(52) U.S. Cl.
CPC .............. *G07C 2009/00587* (2013.01); *G07C 2009/00976* (2013.01)

(58) Field of Classification Search
CPC .. H01M 50/20; H01M 50/216; H01M 50/148; H01M 50/153; Y02E 60/10; G06K 19/0702; G06K 19/0706; G08C 2201/10
USPC ......................................... 70/275; 340/12.55
See application file for complete search history.

(56) References Cited

U.S. PATENT DOCUMENTS

| | | | |
|---|---|---|---|
| 6,647,752 | B1 | 11/2003 | Chaillie |
| 7,227,446 | B2 | 6/2007 | Kumazaki et al. |
| 7,448,238 | B2 | 11/2008 | Shimura et al. |
| 7,664,470 | B2 | 2/2010 | Sugimoto et al. |
| 7,664,471 | B2 | 2/2010 | Sugimoto et al. |
| 7,923,647 | B2 | 4/2011 | Murakami et al. |
| 8,009,410 | B2 | 8/2011 | Goemmel et al. |
| 8,061,170 | B2 | 11/2011 | Calor et al. |
| 8,237,542 | B2 | 8/2012 | Katagiri |
| 8,479,547 | B2 | 7/2013 | Kataya et al. |
| 8,540,165 | B2 | 9/2013 | Foo et al. |
| 8,953,331 | B2 | 2/2015 | Sugimoto et al. |
| 8,976,535 | B2 | 3/2015 | Paek et al. |
| 10,994,699 | B2 | 5/2021 | Hyun |
| 11,077,827 | B2 | 8/2021 | Lee |
| 2003/0222755 | A1 | 12/2003 | Kemper et al. |
| 2005/0136852 | A1 | 6/2005 | Nakagawa et al. |
| 2006/0150696 | A1 | 7/2006 | Eychenne et al. |
| 2007/0227866 | A1 | 10/2007 | Dimig |
| 2009/0145187 | A1 | 6/2009 | Deppner et al. |
| 2011/0313595 | A1 | 12/2011 | Kato |
| 2012/0012659 | A1 | 1/2012 | Sugimoto et al. |
| 2012/0092128 | A1 | 4/2012 | Yamane et al. |
| 2014/0021025 | A1 | 1/2014 | Sersch |
| 2014/0363716 | A1* | 12/2014 | Nishida ............... H01M 50/242 429/96 |
| 2016/0191096 | A1 | 6/2016 | Kishimoto |
| 2016/0250996 | A1 | 9/2016 | Park et al. |
| 2018/0302788 | A1 | 10/2018 | Konchan et al. |
| 2020/0189519 | A1* | 6/2020 | Hyun ....................... B60R 25/24 |
| 2020/0296835 | A1* | 9/2020 | Hyun ................. G07C 9/00944 |
| 2020/0357208 | A1 | 11/2020 | Hyun |
| 2020/0362590 | A1* | 11/2020 | Hyun ................... G06K 19/077 |
| 2020/0362591 | A1* | 11/2020 | Hyun ................. E05B 19/0082 |

FOREIGN PATENT DOCUMENTS

| | | |
|---|---|---|
| CN | 104080988 A | 10/2014 |
| CN | 104466056 A | 3/2015 |
| CN | 111492410 B | 4/2022 |
| CN | 111630575 B | 5/2022 |
| EP | 0987389 A1 | 3/2000 |
| EP | 3056639 A1 | 8/2016 |
| JP | 2001-250521 A | 9/2001 |
| JP | 2004-131936 A | 4/2004 |
| JP | 2007224664 A | 9/2007 |
| JP | 2009-021106 A | 1/2009 |
| KR | 2006-0113443 A | 11/2006 |
| KR | 20120116563 A | 10/2012 |
| KR | 20130066245 A | 6/2013 |
| KR | 20140013393 A | 2/2014 |
| KR | 101496321 B1 | 2/2015 |
| KR | 20150031894 A | 3/2015 |
| KR | 20150050682 A | 5/2015 |
| KR | 101542857 B1 | 8/2015 |
| KR | 20160139689 A | 12/2016 |
| KR | 20170033204 A | 3/2017 |
| WO | 2017135747 A1 | 8/2017 |

OTHER PUBLICATIONS

Office Action dated Apr. 22, 2022 issued in co-pending U.S. Appl. No. 16/764,458.
Office Action dated Oct. 21, 2021 issued in co-pending U.S. Appl. No. 16/764,441.
Office Action dated Sep. 20, 2022 issued over the corresponding Japanese National Phase Patent Application No. 2020-526938 with the English translation thereof.

* cited by examiner

SMART CARD KEY

TECHNICAL FIELD

The present invention relates to a card type smart key, and more specifically, to a card type smart key with improved contact performance with a battery.

BACKGROUND ART

In general, smart keys are widely used in current vehicles, and such smart keys provide usability since a door can be opened and a vehicle can be started without a key blade.

In the case of an existing smart key for a vehicle, a tact switch for a remote keyless entry function is mounted on a printed circuit substrate (PCB) and then a housing is externally assembled. Then, a button exposed to the outside of the housing is switched on/off to perform a remote locking function and an opening function.

Recently, a card type smart key which is thinner than existing smart keys is applied due to the convenience of storage. Since such card type smart keys are formed to have a thickness of 4 mm or less, the card type smart key is manufactured by molding a card type key body by applying a fluid material to an outer shape by molding or a potting method and then hardening the card type key body.

Conventionally, a battery cover on which a battery is mounted is mounted on a key body. The contact structure is pushed up depending on the thickness of the battery. and the completeness of appearance is lowered and the contact performance between the contact portion and the battery is deteriorated.

The background technology of the present invention is disclosed in Korean Patent Publication no. 10-1496321 (registered on Feb. 17, 2015, the title of the invention: Card type smart key for a vehicle).

DISCLOSURE OF THE INVENTION

Technical Problem

An object of the present invention is to provide a card type smart key with improved contact performance between a contact part and a battery because the contact part has elastic restoration force in the battery side direction.

Technical Solution

A card type smart key according to the present invention includes: a key main body part having a circuit substrate installed therein; a battery cover part having a battery mounted thereon, and inserted into an insertion part formed in the key main body part; and at least one contact part installed in the key main body part so as to be in contact with the battery, and having elastic restoration force in the battery side direction. The card type smart key according to the invention may, alternatively, be referred to as a smart card key.

In addition, the contact part includes: a plate part coupled to the key main body part; a deformation part coupled to the plate part so as to be in contact with the battery inserted into the key main body part, and formed of an elastic material.

In addition, the deformation part is formed with an inclined surface so as to be closer to the battery the further it is from the plate part. In addition, the deformation part is formed such that a contact main body protrudes toward the battery inserted into the key main body part.

In addition, the contact part is formed such that the outer circumferential surface thereof on the battery side is round.

In addition, the contact part is coupled to one surface of the plate part facing the battery and further includes a gap maintaining part disposed between the battery and the plate part.

In addition, the gap maintaining part is disposed on a side surface of the deformation part. In addition, the gap maintaining part is formed such that the outer circumferential surface thereof on the battery side is round. In addition, the contact part includes: a first contact part coupled to the key main body part; and a second contact part disposed opposite to the first contact part so as to face the other surface opposite to one surface of the battery facing the first contact part.

Advantageous Effects

A card type smart key according to the present invention has improved contact performance between a contact part and a battery because the contact part has elastic restoration force in the battery side direction.

In addition, as a deformation part is formed with an inclined surface so as to be closer to the battery the further it is from the plate part, the contact performance between the contact part and the battery after the battery is inserted is improved.

In addition, as the outer circumferential surface of the contact part on the battery side is formed to be round, friction is reduced when the battery is inserted, and damage due to the friction is prevented.

In addition, a gap between a plate part and a battery part is maintained by a gap maintaining part, and a deformation part is prevented from being excessively elastically deformed.

In addition, as the outer circumferential surface of the gap maintaining part on the battery side is formed to be round, friction is reduced when the battery is inserted, and damage due to the friction is prevented.

MODE OF IMPLEMENTATION OF THE INVENTION

Hereinafter, an embodiment of a card type smart key according to the present invention will be described with reference to the accompanying drawings. In this process, the thickness of the lines or the size of the components shown in the drawings may be exaggerated for clarity and convenience of description.

In addition, the following terms are defined in consideration of the functions of the present invention, which may vary depending on the intention or practice of a user or an operator. Therefore, the definition of these terms should be based on the content throughout this specification.

Figure 1:
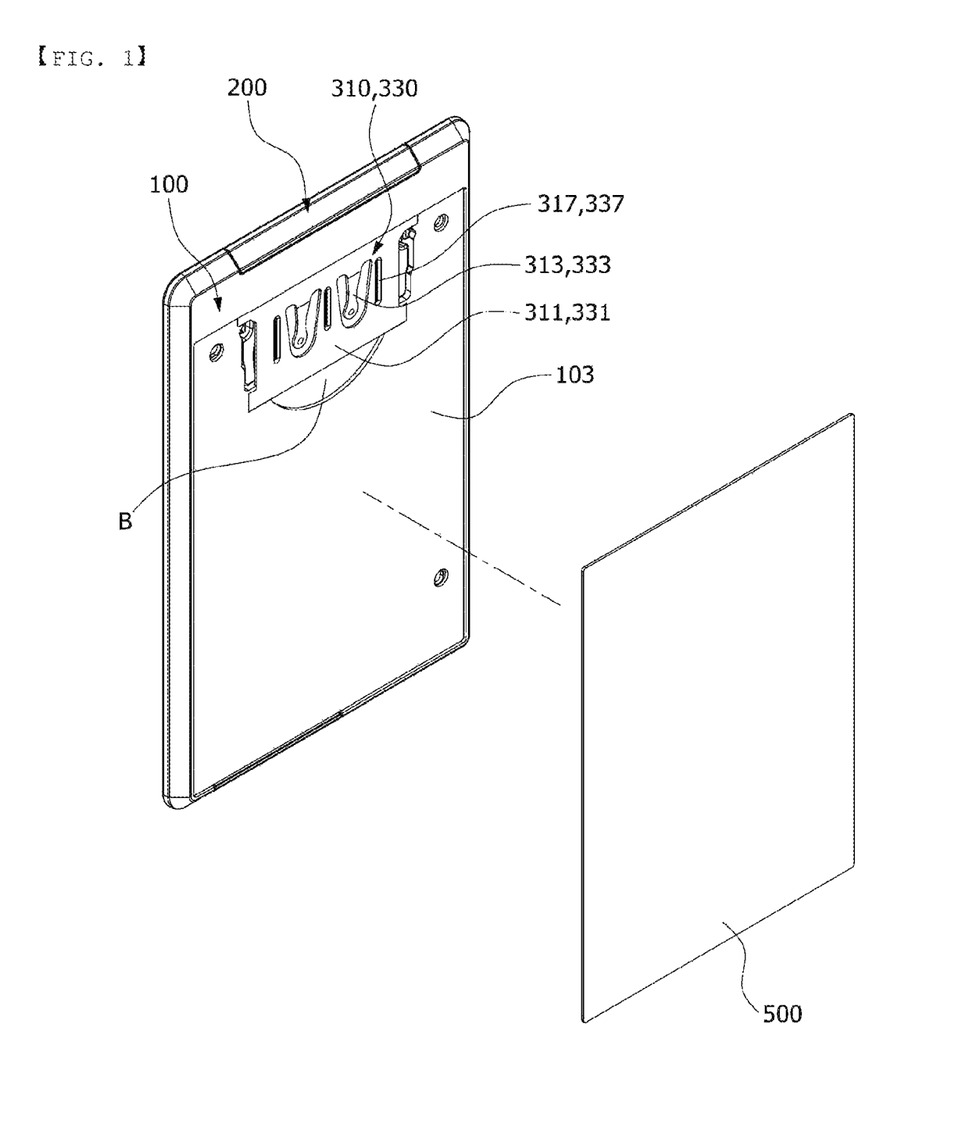
FIG. 1 is an exploded view showing a card type smart key according to an embodiment of the present invention.
Figure 2:
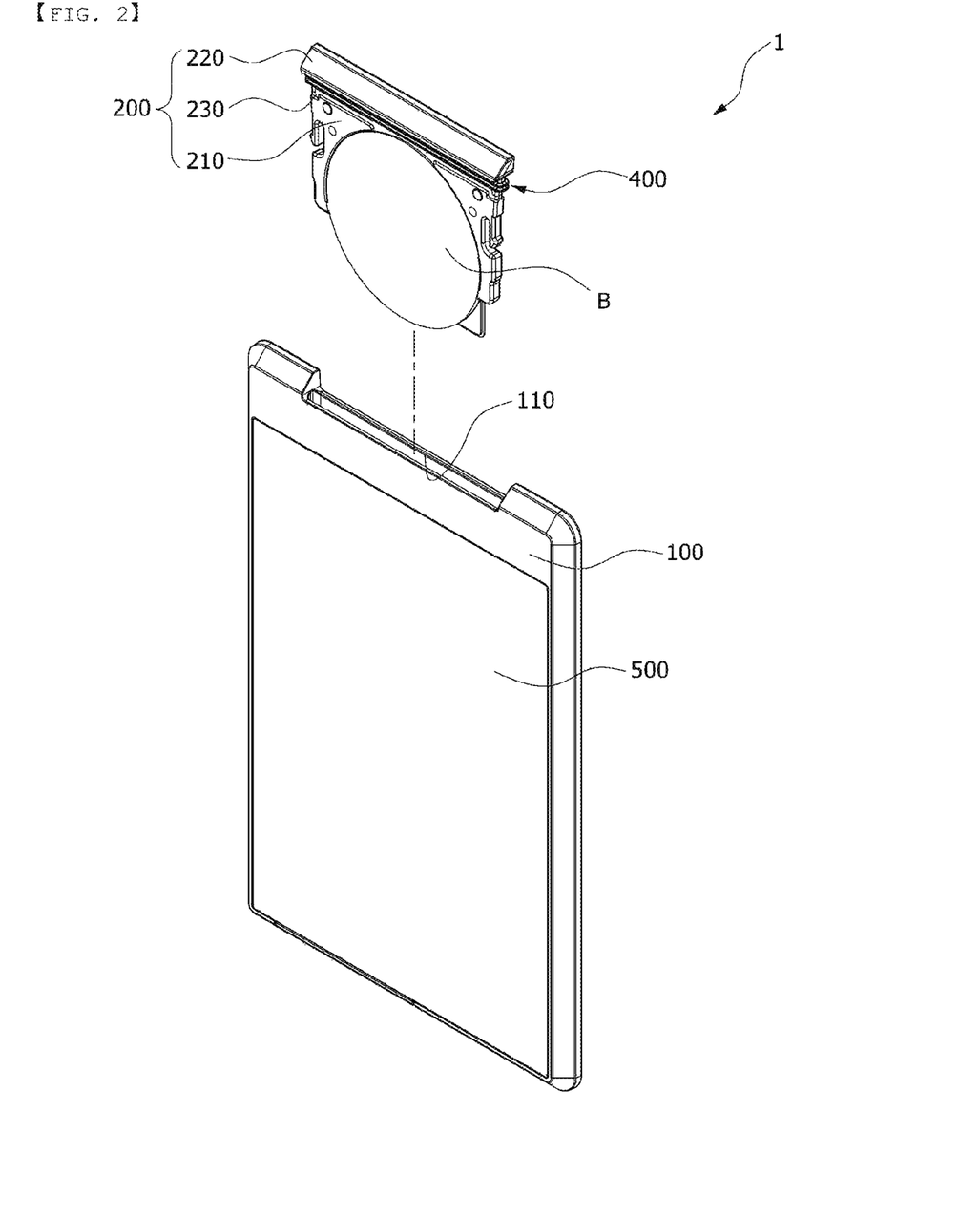
FIG. 2 is a perspective view showing a card type smart key according to an embodiment of the present invention.
Figure 3:
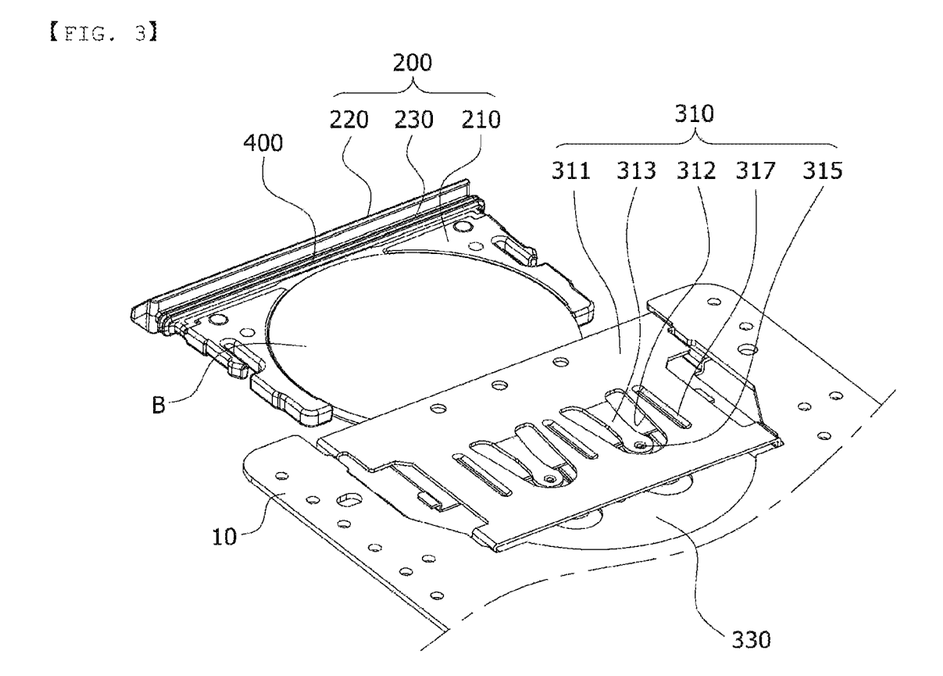
FIG. 3 is a perspective view showing a contact p according to an embodiment of the present invention.
Figure 4:
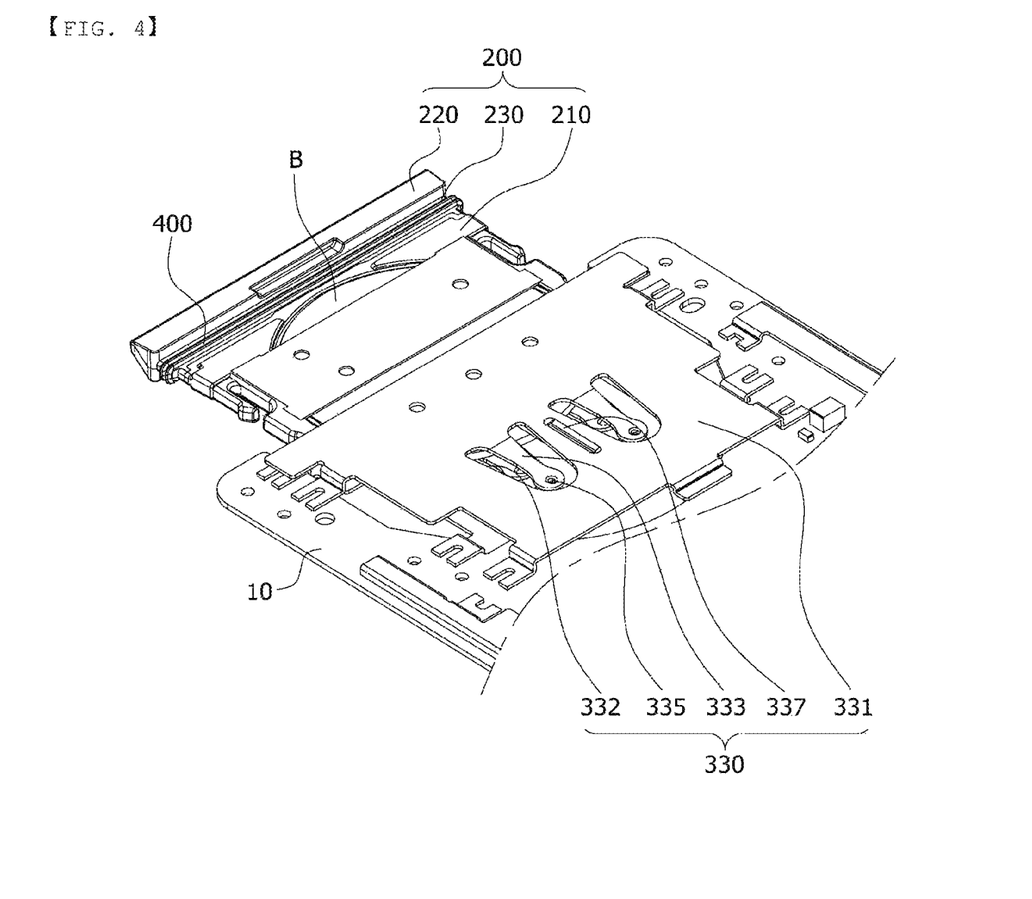
FIG. 4 is a bottom perspective view showing a contact part according to an embodiment of the present invention.
Figure 5:
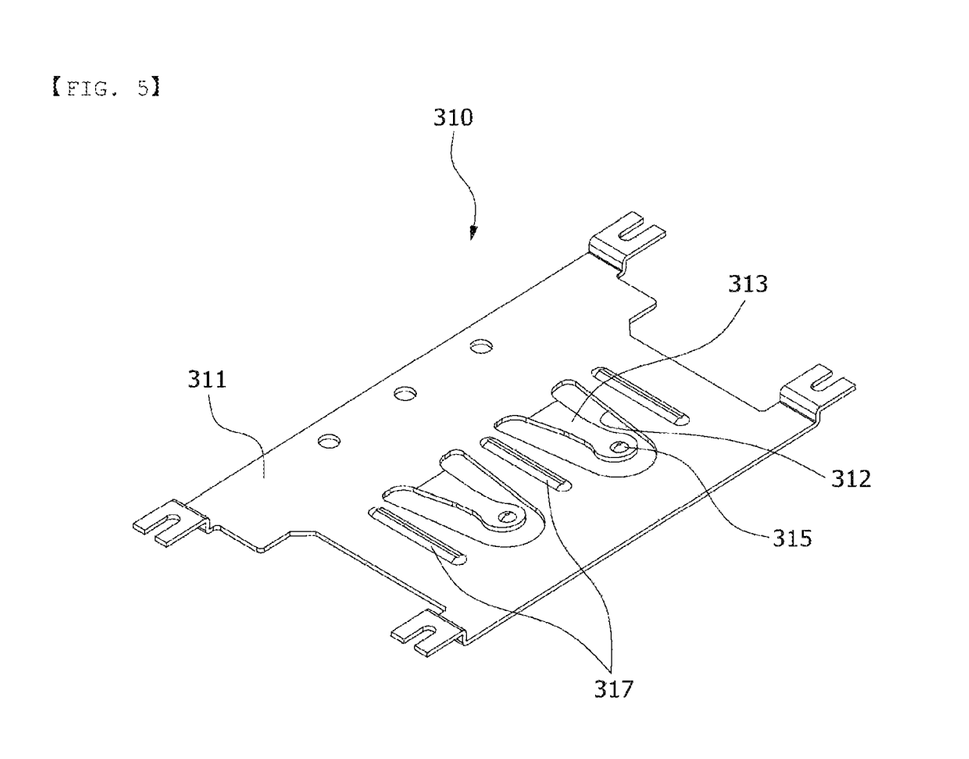
FIG. 5 is a perspective view showing a first contact part according to an embodiment of the present invention.
Figure 6:
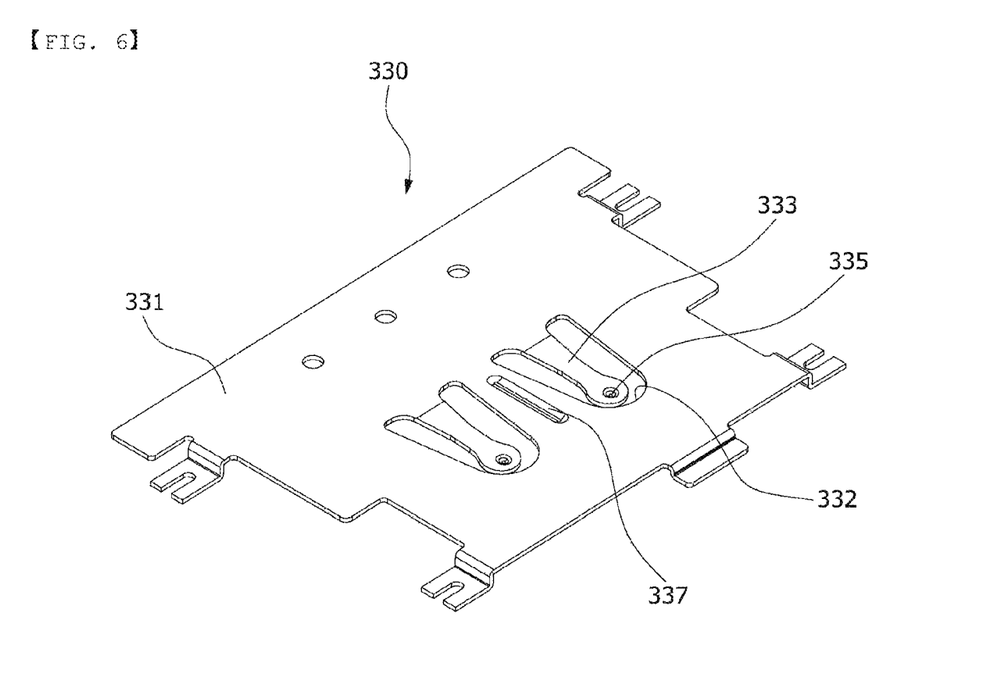
FIG. 6 is a perspective view showing a second contact part according to an embodiment of the present invention.
Figure 7:
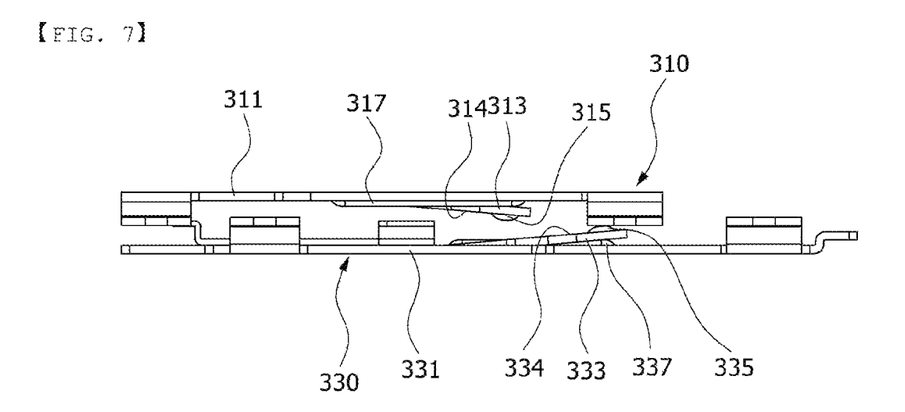
FIG. 7 is a side view of a contact part according to an embodiment of the present invention.
Figure 8:
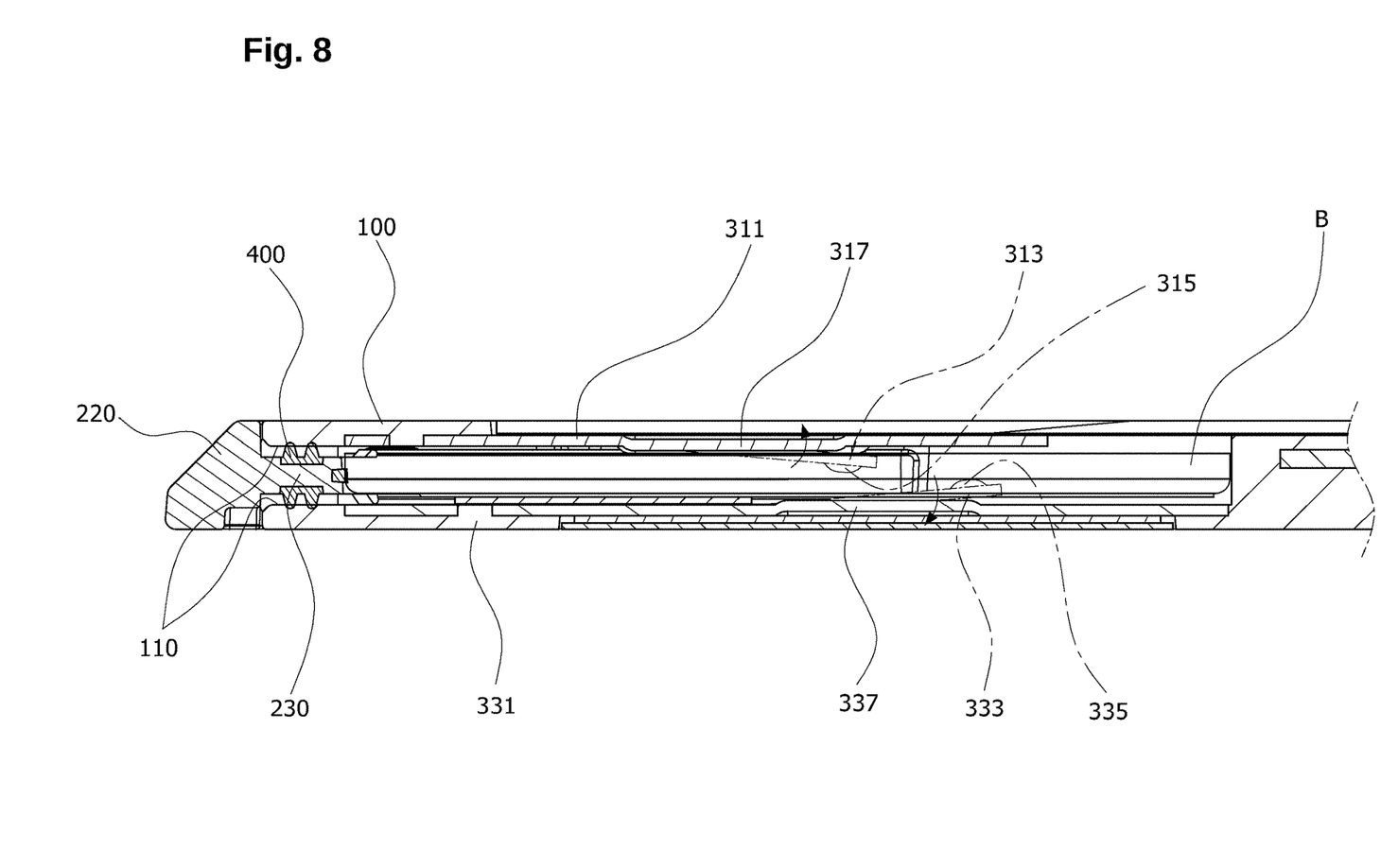
FIG. 8 is a side sectional view showing the state in which a battery is mounted.

FIG. 1 is an exploded view showing a card type smart key according to an embodiment of the present invention. FIG. 2 is a perspective view showing a card type smart key according to an embodiment of the present invention. FIG. 3 is a perspective view showing a contact part according to an embodiment of the present invention. FIG. 4 is a bottom perspective view showing a contact part according to an embodiment of the present invention. FIG. 5 is a perspective view showing a first contact part according to an embodiment of the present invention. FIG. 6 is a perspective view showing a second contact part according to an embodiment of the present invention. FIG. 7 is a side view of a contact part according to an embodiment of the present invention. FIG. 8 is a side sectional view showing the state in which a battery is mounted.

Referring to FIGS. 1 to 8, a card type smart key (1) according to an embodiment of the present invention includes a key main body part (100), a battery cover part (200), a contact part (300), a sealing part (400), and a sheet part (500).

Referring to FIG. 1 and FIG. 2, the key main body part (100) according to an embodiment of the present invention has a circuit substrate (10) installed thereinside, and is prepared in a mold manner. The key main body part (100) may be formed of a plastic material.

Referring to FIG. 1, FIG. 3, FIG. 4, and FIG. 8, the battery cover part (200) according to an embodiment of the present invention has a battery (B) mounted thereon, and is inserted into an insertion part (110) formed in the key main body part (100). The battery cover part (200) includes a battery mounting part (210), a cover main body (220), and a connection part (230).

Referring to FIG. 2, the battery mounting part (210) according to an embodiment of the present invention corresponds to the shape of the battery (B) and is formed to surround the battery (B).

In the present invention, the battery (B) is formed in a disk shape so that an inner side surface of the battery mounting part (210) is formed in a curved surface shape. However, the present invention is not limited thereto, and various modifications may be made to correspond to an outer side surface shape of the battery (B) of a polygonal shape.

The cover main body (220) according to an embodiment of the present invention is exposed to the outside of the key main body part (100), and is formed so as to be gripped such that a user may insert or extract the battery cover part (200) into or from the key main body part (100), specifically the insertion part (110) formed in the key main body part (100), in order to replace the battery (B) of the card type smart key (1).

The cover main body (220) is formed such that one outer side surface thereof is inclined, and thus, a user can easily extract the battery cover part (200) from the key main body part (100) by gripping one surface of the cover main body (220) in order to replace the battery (B).

Referring to FIG. 3 and FIG. 4, the connection part (230) according to an embodiment of the present invention connects the cover main body (220) and the battery mounting part (210), and has the sealing part (400) coupled thereto.

The connection part (230), the battery mounting part (210), and the cover main body (220) may be integrally formed.

Referring to FIG. 1, FIG. 3, and FIGS. 5 to 8, the contact part (300) according to an embodiment of the present invention is installed in the key main body part (100) so as to be in contact with the battery (B), and has elastic restoration force in the battery (B) side direction.

Referring to FIG. 7 and FIG. 8, the contact part (300) is installed between an inner side surface of the key main body part (100) and the battery mounting part (210), and electrically connects the circuit substrate (10) and the battery (B). The contact part (300) includes a first contact part (310) and a second contact part (330).

The contact part (300) is formed of a metal material, and comes into contact with the battery (B) and the circuit substrate (10), respectively. The contact part (300) is provided in plurality. Specifically, the first contact part (310) and the second contact part (330) are disposed on upper and lower sides (refer to FIG. 8) of the battery (B), and are formed as an opposite pole.

For example, when the first contact part (310) is a (+) pole, the second contact part (330) is a (−) pole, and when the first contact part (310) is a (−) pole, the second contact part (330) is a (+) pole. The contact part (300) is coupled to the circuit substrate (10) by welding, and is disposed on the inner side surface of the key main body part (100).

Referring to FIG. 1, FIG. 3, and FIGS. 5 to 8, the contact part (300) includes plate parts (311 and 331), deformation parts (313, 333), contact main bodies (315 and 335), and gap maintaining parts (317 and 337). The gap maintaining parts (317, 337) are formed as indentations in the corresponding plate parts (311 and 331).

Specifically, the first contact part (310) according to an embodiment of the present invention includes a first plate part (311), a first deformation part (313), a first contact main body (315), and a first gap maintaining part (317). The second contact part (330) according to an embodiment of the present invention includes a second plate part (331), a second deformation part (333), a second contact main body (335), and a second gap maintaining part (337).

In the present invention, the plate parts (311 and 331) refer to the first plate part (311) and the second plate part (331), and the deformation parts (313, 333) refer to the first deformation part (313) and the second deformation part (333). Furthermore, the contact main bodies (315 and 335) refer to the first contact main body (315) and the second contact main body (335), and the gap maintaining parts (317 and 337) refer to the first gap maintaining part (317) and second gap maintaining part (337).

Referring to FIG. 8, the plate parts (311 and 331) are coupled to the key main body part (100), and specifically coupled to the inner side surface of the key main body part (100). The plate parts (311 and 331) are disposed on the upper and lower sides of the battery (B) inserted into the insertion part (110) formed in the key main body part (100).

Referring to FIG. 3, FIG. 5, and FIG. 6, the plate parts (311 and 331) are formed with installation parts (312 and 332). The installation parts (312 and 332) are formed in a hole shape, and the deformation parts (313, 333), to be described later, are disposed inside the installation parts (312 and 332).

The installation parts (312 and 332) prevent interference between the plate parts (311 and 331) and the deformation parts (313, 333) when the battery (B) is inserted or extracted, and prevent damage caused by the interference between the plate parts (311 and 331) and the deformation parts (313, 333).

Referring to FIG. 5, FIG. 6, and FIG. 7, the deformation parts (313, 333) according to an embodiment of the present invention are coupled to the plate parts (311 and 331) so as to be in contact with the battery (B) inserted into the key main body part (100), and are formed of an elastic material. The deformation parts (313, 333) may be coupled to the plate parts (311 and 331) as a separate material, or may be integrally formed with the plate parts (311 and 331).

The deformation parts (313, 333) are elastically deformable, and are disposed closer to the battery (B) than the plate parts (311 and 331). Thereby, when the battery (B) is inserted into the inside of the key main body part (100) through the insertion part (110), the deformation parts (313, 333) are located on the movement path of the battery (B).

When the deformation parts (313, 333) are in contact with the battery (B), and the battery (B) pressurizes the deformation parts (313, 333) in the outside direction of the battery (B), the deformation parts (313, 333) have elastic restoration force to the battery (B) side, so that the contact force between the contact parts (310 and 330) and the battery (B) is maintained.

As the deformation parts (313, 333) are disposed closer to the battery (B) than the plate parts (311 and 331), the contact force between the contact part (300) and the battery (B) is maintained, and the plate parts (311 and 331) are prevented from being pressed to the outside direction of the key main body part (100).

Referring to FIG. 7, the deformation parts (313, 333) according to an embodiment of the present invention are formed with inclined surfaces (314 and 334) so as to be closer to the battery (B) the further it is from the plate parts (311 and 331).

Specifically, the deformation part (313) positioned on the upper side of the battery (B) (refer to FIG. 7) is formed with an inclined surface (314) so as to be inclined downward toward the right side, and the deformation part (333) is formed with an inclined surface (334) so as to be inclined upward toward the right side.

Referring to FIGS. 5 to 7, the deformation parts (313, 333) are formed such that the contact main bodies (315 and 335) are formed to protrude toward the battery (B) inserted into the key main body part (100). Thereby, the contact force between the deformation parts (313, 333) and the battery (B) is improved.

The contact main bodies (315 and 335) are formed such that the outer circumferential surface thereof on the battery (B) side is round. Thereby, when the contact main bodies (315 and 335) disposed on the movement path of the battery (B) inserted into the insertion part (110) formed in the key main body part (100) come into contact with the battery (B), friction is reduced.

The battery (B) is inserted into the inside of the key main body part (100) along the outer circumferential surface of the contact main bodies (315 and 335), which is formed to be round, and the deformation parts (313, 333) are prevented from being damaged due to the friction between the battery (B) and the contact main bodies (315 and 335).

Referring to FIG. 1, FIG. 3, FIG. 5 and FIG. 7, the gap maintaining parts (317 and 337) according to an embodiment of the present invention are coupled to one surface of the plate parts (311 and 331) facing the battery (B), and are disposed between the battery (B) and the plate parts (311 and 331).

The height of the gap maintaining parts (317 and 337) are formed to be less than the height between the plate parts (311 and 331) and an end on the battery (B) side of the deformation parts (313, 333).

When the battery (B) is inserted into the key main body part (100) through the insertion part (110), the battery (B) comes into contact with the contact main bodies (315 and 335), and the contact main bodies (315 and 335) are elastically deformed only to an end on the battery (B) side of the gap maintaining parts (317 and 337).

Thereby, the deformation parts (313, 333) are prevented from being excessively elastically deformed by the height of the gap maintaining parts (317 and 337), and the deformation parts (313, 333) are elastically deformed only by a predetermined range.

Referring to FIGS. 3 to 6, the gap maintaining parts (317 and 337) are formed such that the outer circumferential surface thereof on the battery (B) side is round. Thereby, when the battery (B) is inserted into the inside of the key main body part (100), friction with the battery (B) is reduced.

Referring, to FIG. 3 and FIG. 4, the gap maintaining parts (317 and 337) are disposed on a side surface of the deformation parts (313, 333). Referring to FIG. 3, the deformation parts (313, 333) are provided in plurality, and the gap maintaining parts (317 and 337) are disposed among the plurality of deformation parts (313, 333).

Thereby, when the battery (B) is inserted into the key main body part (100), the battery (B) is uniformly contacted, the deformation parts (313, 333) are prevented from being excessively elastically deformed, and a gap between the plate parts (311 and 331) and the battery (B) is maintained to be constant.

Referring to FIG. 1 and FIG. 2, the sheet part (500) according, to an embodiment of the present invention is coupled to the outside of the key main body part (100), and an image such as a product logo and a manufacturer of the card type smart key (1) is printed on the sheet part (500).

The operation principle and effect of the card type smart key (1) according to an embodiment of the present invention, which is configured as described above, will be described.

Referring to FIGS. 1 to 8, the card type smart key (1) according to an embodiment of the present invention includes the key main body part (100), the battery cover part (200), the contact part (300), the sealing part (400), and the sheet part (500).

Referring to FIG. 1 and FIG. 2, the battery cover part (200) having the battery (B) mounted thereon is coupled to the insertion part (110) formed in the key main body part (100). Specifically, the battery (B) is mounted on the battery mounting part (210), and a user grips the cover main body (220) and mounts the cover main body (220) on the key main body part (100) through the insertion part (110).

Referring to FIG. 2, the connection part (230) connects the battery mounting part (210) and the cover main body (220), and has the sealing part (400) coupled thereto along an outer side surface of the connection part (230) in a strip shape.

The sealing part (400) is formed of a rubber material so as to be elastically deformed, and thereby when the cover part of the battery (B) is inserted into the key main body part (100) or extracted from the key main body part (100), the sealing part (400) is pressed against an inner surface of the key main body part (100).

Furthermore, the sealing part (400) prevents foreign matters such as moisture from penetrating into the inside of the key main body part (100). The key main body part (100) is prepared in a mold manner, and the rigidity against the elastic force of the sealing part (400) is secured while maintaining the shape.

The key main body part (100) and the contact part (300) are prepared in an insert injection manner, and the contact part (300) of a metal material is disposed on the inside of the key main body part (100).

Referring to FIGS. 3 to 8, the contact part (300) is installed in the key main body part (100) so as to be in contact with the battery (B), and has elastic restoration force in the battery (B) side direction. Specifically, the contact part (300) is disposed on the upper and lower sides of the battery (B) (refer to FIG. 8), and contact-pressurizes the battery (B).

Referring to FIG. 7 and FIG. 8, the contact part (300) includes the plate parts (311 and 331), the deformation parts (313 and 333), and the gap maintaining parts (317 and 337).

The deformation parts (313 and 333) are formed with the inclined surfaces (314 and 334) so as to be closer to the battery (B) the further it is from the plate parts (311 and 331).

Thereby, even when the deformation parts (313 and 333) are contact-pressurized by the battery (B) when the battery (B) is inserted, the contact force between the battery (B) and the deformation parts (313 and 333), specifically the contact main bodies (315 and 335), is maintained by the elastic restoration force.

Referring, to FIGS. 3 to 6, the gap maintaining parts (317 and 337) are coupled to one surface of the plate parts (311 and 331) facing the battery (B), and disposed between the battery (B) and the plate parts (311 and 331).

The vertical distance (height) from the plate parts (311 and 331) to an end on the battery (B) side of the gap maintaining parts (317 and 337) is formed to be less than the vertical distance from the plate parts (311 and 331) to an end on the battery (B) side of the deformation parts (313 and 333).

Thereby, the distance between the plate parts (311 and 331) and the battery (B) is maintained by the height of the gap maintaining parts (317 and 337) and the deformation parts (313 and 333) are prevented from being excessively elastically deformed.

Furthermore, the deformation parts (313 and 333) are elastically deformed only in a predetermined section due to the gap maintaining parts (317 and 337).

Referring to FIGS. 3 to 6, the gap maintaining parts (317 and 337) are provided in plurality, and are disposed on a side surface of the deformation parts (313, 333), so that the gap between the plate parts (311 and 331) and the battery (B) is uniformly maintained.

Referring to FIG. 1, as the sheet part (500) is mounted on the outside of the key main body part (100), the rigidity to the key main body part (100) is secured, and a degree of freedom for exterior design, such as a decorative application, is secured with the sheet part (500).

Although the present invention has been described with reference to the embodiments illustrated in the drawings, this is merely exemplary. It will be understood by those skilled in the art that various modifications and equivalent embodiments thereto may be implemented. Accordingly, the true technical protection scope of the present invention should be determined by the following claims.

DESCRIPTION OF THE REFERENCE NUMERALS OR SYMBOLS

1: Card type smart key
10: Circuit substrate
110: insertion part
210: Battery mounting part
230: Connection part
310: First contact part
311, 331: Plate part
313, 333: Deformation part
315, 335: Contact main body
400: Sealing part
B: Battery
100: Key main body part
200: Battery cover part
220: Cover main body
300: Contact part
330: Second contact part
312, 332: Installation part
314, 334: Inclined surface
317, 337: Gap maintaining part
500: Sheet part

The invention claimed is:

1. A smart card key comprising:
a key main body part having a circuit substrate installed therein;
a battery cover part configured to have a battery mounted thereon, which battery is configured to be inserted into an insertion part in the key main body part; and
a contact part, installed in the key main body part, the contact part configured to be placed in contact with the battery and having an elastic restoration force in a battery side direction,
wherein the contact part comprises a plate part coupled to the key main body part and defining a planar surface; and a deformation part coupled to the plate part and configured to be placed in contact with the battery when the battery is inserted into the key main body part,
wherein the deformation part is formed of an elastic material,
and wherein the contact part further comprises a gap maintaining part which comprises an indentation formed in the plate part, the gap maintaining part including an indented portion disposed between the battery and the planar surface of the plate part, the gap maintaining part configured to maintain a gap between the battery and a portion of the plate part outside of the gap maintaining part, and to position a surface of the battery.

2. The smart card key of claim 1, wherein the deformation part comprises an inclined surface closer to the battery the further it is from the plate part.

3. The smart card key of claim 2, wherein the deformation part further comprises a contact main body which protrudes toward the battery when inserted into the key main body part.

4. The smart card key of claim 3, wherein the contact main body comprises an outer circumferential surface on the battery side which is round.

5. The smart card key of claim 1, wherein the gap maintaining part is disposed on a side surface of the deformation part.

6. The smart card key of claim 1, wherein the gap maintaining part comprises a circumferential surface on the battery side which is round.

7. The smart card key of claim 1, wherein the contact part comprises a first contact part coupled to the key main body part; and a second contact part disposed opposite to the first contact part so as to face a surface of the battery opposite to another surface of the battery facing the first contact part.

8. The smart card key of claim 1, wherein the gap maintaining part operates to protect the deformation part from becoming excessively deformed.

9. A smart card key comprising:
a key main body part having a circuit substrate installed therein;
a battery cover part configured to have a battery mounted thereon, which battery is configured to be inserted into an insertion part in the key main body part; and
a contact part, installed in the key main body part, the contact part configured to be placed in contact with the battery and having an elastic restoration force in a battery side direction,
wherein the contact part comprises:
a plate part coupled to the key main body part and defining a planar surface;
a deformation part coupled to the plate part, which deformation part is configured to be placed in contact with the battery when the battery is inserted into the key main body part; and
a gap maintaining part which is formed by an indentation in the plate part, the gap maintaining part including an indented portion disposed between the battery and the planar surface of the plate part,
wherein the deformation part is formed of an elastic material and connected to a surface of the plate part configured to face toward the battery, and
wherein the gap maintaining part, which comprises an indentation formed in the plate part, includes an indented portion disposed between the battery and the planar surface of the plate part, and is configured to maintain a gap between the battery and the plate part.

10. The smart card key of claim 9, wherein the gap maintaining part operates to protect the deformation part from becoming excessively deformed.

11. A smart card key comprising:
a key main body having a circuit board installed therein, the main body having an edge portion with a notch formed therein and an insertion slot disposed inside of the notch;
a battery cover part configured to receive a battery therein and to be inserted into the insertion slot formed in the key main body, the battery cover part comprising a cover main body including an outer edge portion which fits into and fills the notch of the key main body; and
first and second contact parts installed in the key main body for contacting two opposite sides of the battery, each of the contact parts having an elastic restoration force in a battery side direction,
wherein each of the contact parts comprises:
a plate part coupled to the key main body and defining a planar surface;
a deformation part coupled to the plate part, which deformation part is in contact with the battery inserted into the key main body and defining a planar surface, wherein the deformation part is formed of an elastic material and connected to a surface of the plate part configured to face toward the battery, and
wherein the plate part further comprises a gap maintaining part which comprises an indentation formed in the plate part, the gap maintaining part including an indented portion disposed between the battery and the planar surface of the plate part.

12. The smart card key of claim 11, wherein in each of the contact parts, the gap maintaining part operates to protect the deformation part from becoming excessively deformed.

* * * * *

UNITED STATES PATENT AND TRADEMARK OFFICE
CERTIFICATE OF CORRECTION

PATENT NO. : 11,508,198 B2
APPLICATION NO. : 16/764416
DATED : November 22, 2022
INVENTOR(S) : YoungJin Hyun It is certified that error appears in the above-identified patent and that said Letters Patent is hereby corrected as shown below:

On the Title Page

Item (71):
Change "CONTINENTAL AUTOMOTIVE GMBH, Hannover (DE)" to -- HONDA MOTOR CO., LTD., Tokyo (JP) --

Signed and Sealed this
Twenty-fifth Day of April, 2023

Katherine Kelly Vidal
*Director of the United States Patent and Trademark Office*